April 21, 1959 H. V. SMITH 2,882,724
FREE FLOAT LIQUID METERING APPARATUS
Filed June 27, 1957 2 Sheets-Sheet 1
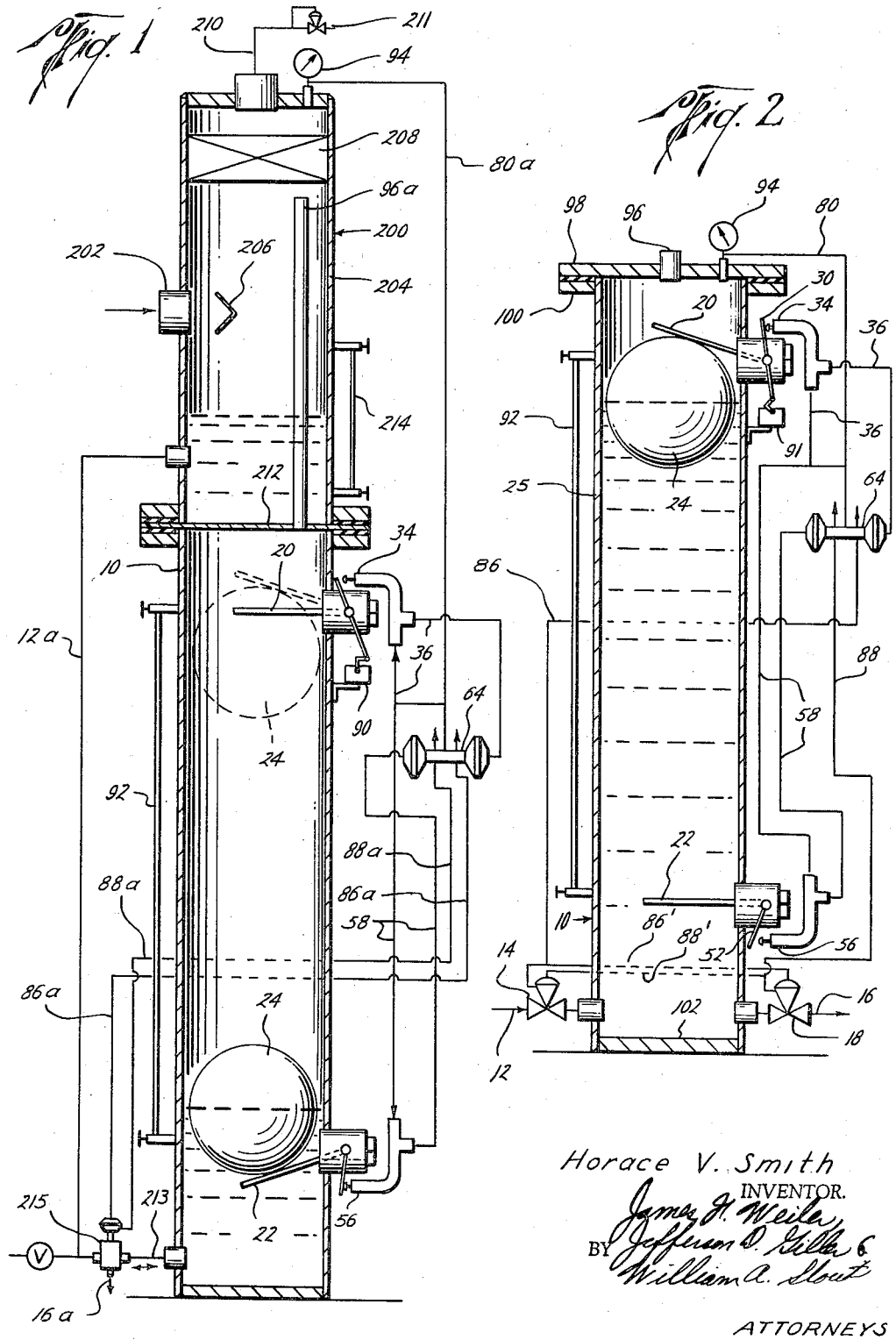
Horace V. Smith
INVENTOR.
BY
ATTORNEYS

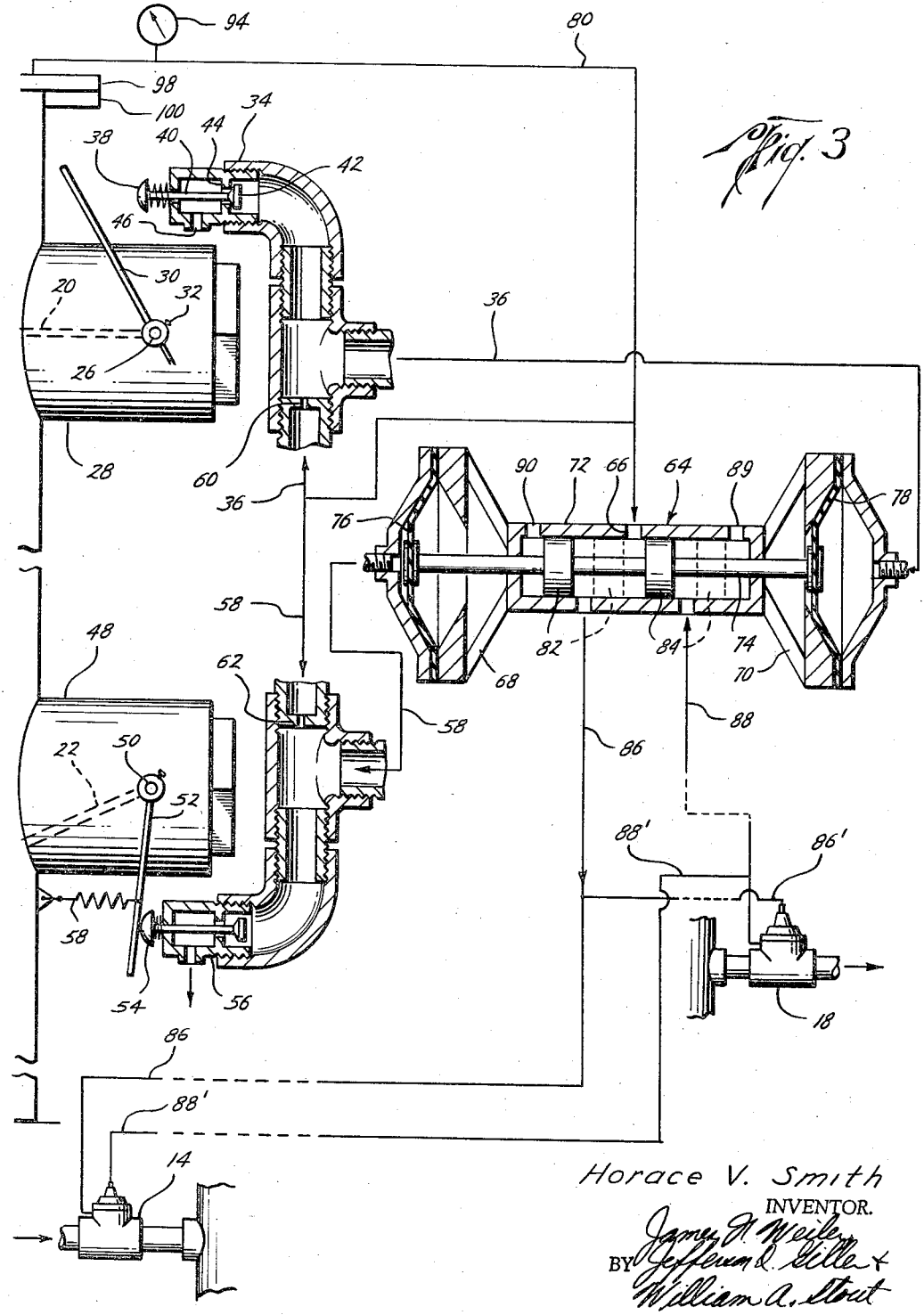

United States Patent Office 2,882,724
Patented Apr. 21, 1959

2,882,724

FREE FLOAT LIQUID METERING APPARATUS

Horace V. Smith, Houston, Tex., assignor to Oil Metering and Processing Equipment Corp., Houston, Tex., a corporation of Texas Application June 27, 1957, Serial No. 668,478

7 Claims. (Cl. 73—200)

The present invention relates to an improved liquid metering apparatus, and more particularly relates to an improved liquid metering apparatus utilizing a free float which is especially useful in metering liquids containing paraffins and foam such as in connection with oil and gas wells and gathering systems.

In common use in metering liquids such as from oil and gas wells there are metering apparatus which have a chamber which automatically fills and empties with each such cycle being counted. The volume of the metering chamber being known then the volume passing through the metering apparatus is directly indicated by the counter. However, such liquids many times carry paraffins and/or miscellaneous suspended solids which deposit on the internal walls of the metering chamber changing its effective volume and thereby destroying the accuracy of the metering apparatus.

Accordingly, it is a major object of the present invention to provide an improved liquid metering apparatus which automatically maintains a constant volume within the metering chamber.

Another object of the present invention is to provide such a liquid metering apparatus having a vertical metering chamber of uniform cross sectional configuration and a free float in the chamber substantially filling and loosely fitting the horizontal configuration of the chamber whereby the float prevents a build up of deposits on the wall of the chamber.

Another object is the provision of a meter in which the upper liquid level and lower liquid level in the metering chamber may each be separately calibrated.

A still further object of the present invention is the provision of an inlet and outlet valve element control means whereby the operation of such valve elements at the upper liquid level and the lower liquid level in the metering chamber may be separately calibrated.

Yet a further object of the present invention is the provision of such a metering chamber in which the calibration of the control elements may be effected from the outside so that the metering vessel may be readily calibrated and various repairs made from the outside.

Another object is the provision of a metering apparatus of the character mentioned which may be incorporated with a separator thus forming what may be termed a metering separator particularly suited for the separation of oil and gas and the metering of liquid containing paraffins and/or other suspended solids.

And still a further object of the present invention is the provision of such a metering apparatus which is relatively inexpensive to manufacture, maintain and repair and is dependable in operation.

Other and further objects, features and advantages will be apparent from the following description of the presently preferred example of the present invention, given for the purpose of disclosure and taken in conjunction with the accompanying drawings, where like character references designate like parts throughout the several views and where;

Figure 1 is a vertical sectional view, partly diagrammatic, of a liquid metering separator constructed according to the invention, Figure 2 is a vertical sectional view, partly diagrammatic, illustrating the presently preferred form of metering apparatus according to the invention, and Figure 3 is an enlarged view, partly sectional and partly diagrammatic, illustrating the valve element control means for inlet and outlet valve elements.

Referring now to the drawings, and more particularly to Figure 2, a metering vessel 10 is provided to which is connected at the lower end a liquid inlet passage or line 12 controlled by an inlet valve element here shown as the inlet valve 14 for introducing liquid into the metering vessel 10. Similarly, a liquid outlet line or passage 16 controlled by an outlet valve element here shown as the outlet valve 18 is also provided at the lower end of the metering vessel 10. Thus, upon simultaneous action of the valves 14 and 18 liquids, such as oil, fill and drain from the metering vessel 10. As presently described, these valve elements are simultaneously controlled and the controls may be independently calibrated to provide a highly accurate and efficient metering of liquid flowing into and out of the metering vessel 10.

Near the upper and lower ends of the metering vessel 10 and extending into said metering vessel 10 are the movable members or arms 20 and 22 respectively which are adapted to be contacted and moved by the free float loosely fitting in this metering vessel 10. That portion of the metering vessel 10 between the upper and lower movable members 20 and 22 may be referred to as the metering chamber 25. This metering chamber 25 is vertical and of uniform horizontal cross sectional configuration. For ease of manufacture the entire metering vessel 10 rather than just the metering chamber 25 is vertical and of uniform cross sectional configuration with such cross section configuration here shown as circular. The free float 24 substantially fills and loosely fits the horizontal configuration of the metering chamber 25 and in this example the free float 24 is a ball having a diameter slightly less than the internal diameter of the metering chamber 25. It has been found in practice that for metering chambers 25 approximately 12 inches in internal diameter a difference between this internal diameter of the metering chamber 25 and the diameter of the spherical float 24 of one-quarter of one inch is quite satisfactory. For a dual purpose which will be explained later this float 24 is designed to float on the liquid in the metering chamber 25 and thus ride up and down in the metering chamber 25 as the liquid level in such metering chamber 25 rises and falls.

The upper and lower movable members or arms 20 and 22 are part of a control pressure system for controlling an operating pressure system which actuates the pressure responsive inlet and outlet valves 14 and 18.

The upper movable member 20 (see Figure 3) is an arm secured to an upper actuating assembly including at one end the rock shaft 26 extending out of the upper tubular nozzle 28 extending from the metering vessel 10. Conventional means, not shown, permit the rock shaft 26 to have a fluid tight seal where it passes through the nozzle 28 and yet be rotatably oscillated by a vertical swinging movement of the upper movable member 20. Also included in this upper actuating assembly is a contact arm 30 adjustably secured to the rock shaft 26 such as by the set screw 32 for movement with the rock shaft 26 in a plane perpendicular to this rock shaft 26.

Located close to the nozzle 28 is an upper bleed valve 34 in a pressure line 36 which bleed valve 34 is opened by pressure of the contact arm 30 on the button 38 of the spring loaded normally closed valve stem 40. As shown in Figure 3 this upper bleed valve 34 is closed by the contact of the valve element 42 against the valve seat 44. Movement of the valve stem to the right as viewed in Figure 3 will open the bleed valve 34 permitting the escape of gas pressure out the exhaust port 46.

This particular bleed valve 34 is commercially known as a "button" valve of which many are readily available on the commercial market and no further description thereof is deemed necessary.

The lower movable member 22 likewise extends into a lower nozzle 48 and is secured to a lower actuating assembly including a lower rock shaft 50 to which is adjustably secured a lower contact arm 52. This lower contact arm 52 is adapted to depress and release the button 54 on the lower bleed valve 56 in a pressure line 58. It will be noted that this lower contact arm 52 is downwardly directed while the upper contact arm 30 is upwardly directed so that upward movement of the upper movable member 20 when contacted by the rising float 24 will cause the upper contact arm 30 to contact the button 38 in the upper bleed valve 34 and downward movement of the lower movable member 22 by a downward movement of the free float 24 will cause the lower contact arm 52 to depress the button 54 on the lower bleed valve 56. When the free float 24 is not in contact with the upper movable member 20 the weight of this upper movable member 20 will cause it to fall downwardly to the horizontal position shown in Figure 3 where it may be stopped such as by pins, not shown, through the upper nozzle 28. This movement frees the upper contact member 30 from the button 38 allowing the upper bleed valve 34 to close when the float 24 is not contacting the upper movable member 20.

Because the lower movable member 22 will tend to fall under its own weight a tension spring 58 is connected to the lower contact arm 52 to normally urge it to the left as viewed in Figure 3 and thus keep it free from the button 54 until the lower movable arm 22 is contacted by the free float 24 upon its downward movement.

Provided in the pressure line 36 upstream of the upper bleeder valve 34 is a restriction 60 and a similar restriction 62 is provided in the pressure line 58 to the lower bleed valve 56 ahead of this lower bleed valve 56 for a purpose which will be made clear later.

These upper and lower bleed valves 34 and 56 respectively are connected to an operating pressure system which includes the pressure responsive pilot valve indicated generally by the numeral 64, here shown as a double diaphragm four-way valve including the lefthand diaphragm assembly 68 and the righthand diaphragm assembly 70. Contained in the housing 72 of this pressure responsive pilot valve 64 is the horizontal valve stem 74 connected at its left end to the flexible diaphragm 76 in the left diaphragm assembly 68 and connected at its right end to the flexible diaphragm 78 in the righthand diaphragm assembly 70. In the position shown in Figure 3 pressure has been applied to the outside of the righthand diaphragm 78 and bled from the outside of the lefthand diaphragm forcing the valve stem 74 to the left. By bleeding pressure from the right hand diaphragm assembly 70 and applying it to the lefthand diaphragm 68 the valve stem 74 will be reciprocated to the right. In the position illustrated in Figure 3 gas pressure entering the inlet port 66 from the pressure line 80 passes between the valve stem enlargements 82 and 84 and into the pressure lines 86 and 86' connected to the inlet and outlet valves 14 and 18 here illustrated as double acting diaphragm motor valves. Pressure in line 86 flows against the underside of the diaphragm (not shown) of the inlet valve 14 opening inlet valve 14 and pressure in line 86' flows against the upper side of the diaphragm (not shown) of the outlet valve 18 closing this valve. Pressure in the pressure line 88 from the underside of the diaphragm (not shown) of the outlet valve 18 and in pressure line 88' from the upper side of the diaphragm (not shown) of the inlet valve drains into the pressure responsive pilot valve 64 to the right of the valve stem enlargement 84 and out the exhaust port 89.

When the valve stem 74 is reciprocated to the right so that the valve stem enlargements 82 and 84 are in the position indicated by the dotted lines, pressure entering from the pressure line 80 will pass through the pressure responsive pilot valve 64 into the pressure lines 88 and 88' against the under side of the diaphragm (not shown) of the outlet valve 18 opening it and against the upper side of the diaphragm (not shown) of the inlet valve 14 closing it. Pressure in the lines 86 and 86' drains through the housing 72 of the pressure responsive pilot valve 64 to the left of the valve stem enlargement 82 and out the exhaust port 90. Thus as the valve stem 74 is reciprocated, pressure from the pressure line 80 will be alternately directed through the pressure lines 86 and 86', and 88 and 88' to opposite sides of the diaphragms of the inlet and outlet valves 14 and 18 and pressure will be simultaneously bled from the other side of their diaphragms thereby simultaneously opening one such inlet or outlet valve and closing the other inlet or outlet valve.

The pressure responsive pilot valve 64 may be of any preferred type of which several are readily available on the commercial market. Accordingly, no further description thereof is necessary.

The inlet and outlet valves 14 and 18 may be of any preferred type of pressure responsive valves such as double acting or single acting diaphragm motor valves of which many are commercially available and accordingly no further description of them is necessary. If single acting diaphragm valves are used then the pressure lines 86' and 88' may be omitted as pressure operates such valves in one direction and draining pressure operates them in another direction.

As shown in Figure 3 the pressure line 36 in which the upper bleed valve 34 is located is connected downstream of the restriction 60 to the right hand diaphragm assembly 70 of the pressure responsive pilot valve 64 and the pressure line 58 in which the lower bleed valve 56 is located is connected downstream of the restriction 62 to the lefthand diaphragm assembly 68 of the pressure responsive pilot valve 64. These two pressure lines 36 and 58 downstream of their respective restrictions 60 and 62 are of greater internal diameter than the fluid passages through these restrictions 60 and 62. As this control pressure system is arranged, when both bleed valves 34 and 56 are closed the pressure throughout the pressure lines 36 and 58 will be at an equilibrium since these pressure lines 36 and 58 are attached to a common pressure line 80 and thus the valve stem 74 of the pressure responsive pilot valve 64 will remain motionless as the pressure on the diaphragms 76 and 78 will be equal. When the lower bleed valve 56 is opened, as illustrated in Figure 3, by movement of the lower movable member 22, pressure in the lefthand diaphragm assembly 68 of the pressure responsive pilot valve 64 will be momentarily reduced by exhausting out the lower bleed valve 56 due to the restriction 62 in the pressure line 58 preventing a rapid build-up in the pressure line 58 downstream of this restriction 62. When this bleeding of pressure from the lefthand diaphragm assembly 68 occurs the pressure in the righthand diaphragm assembly 70 will snap the valve stem 74 in the pressure responsive pilot valve 64 to the left causing pressure to be applied through pressure line 86 to the inlet valve 14 opening it and simultaneously through pressure line 86' to the outlet valve 18 closing it. Thereafter, when the upper bleed valve 34 is opened after pressure in the pressure lines 36 and 58 has come to an equilibrium, pressure will be drained from the right hand diaphragm assembly 70 so that the pressure in the left hand diaphragm assembly 68 will snap the valve stem 74 of the pressure responsive pilot valve 64 to the right thereby permitting pressure to be applied through the pressure line 88 to the outlet valve 18 opening it and simultaneously through pressure line 88' to the inlet valve 14 closing it. As best shown in Figure 2 a counter 91 of any conventional type is provided such as near the upper nozzle 28 where it is connected to and actuated by an extension of the upper contact arm 30 so that each oscillation of the rock shaft 26 is indicated and an accurate count is automatically maintained of each time the metering chamber 25 empties and fills. As mentioned, the counter 91 is diagrammatically illustrated and any conventional counter mechanism may be used, a number of which are readily available on a commercial market and, accordingly, no further description thereof is deemed necessary.

The metering vessel 10 may be provided with a conventional liquid level gauge 92 to indicate the liquid level and a pressure gauge 94 to indicate pressure. Also provided at the top of the metering vessel 10 is a gas equalizing connection 96. The upper end of the metering vessel 10 is closed such as by the upper plate 98 secured to the flange 100 and the lower end of the metering vessel 10 is closed such as by a lower plate 102.

In operation of the liquid metering apparatus of Figures 2 and 3 liquid, such as oil, water, or mixtures thereof is permitted to enter the inlet line 12 when the inlet valve 14 is open, which liquid flows into the interior of the metering vessel 10, the outlet valve 18 being closed. As liquid rises in the metering chamber 25 the free float 24 will rise until it strikes the upper movable member 20. As this free float 24 is rising both bleed valves 34 and 56 are closed so that the pressure on both diaphragms in the pressure responsive pilot valve 64 is the same. When the upper movable member 20 is pivoted upwardly by the free float 24 the upper contact arm 30 will open the upper bleed valve 34 causing the valve stem 74 in the pressure responsive pilot valve 64 to move to the right from the position illustrated in Figure 3 as has been previously described thereby simultaneously opening the outlet valve 18 and closing the inlet valve 14 whereupon the liquid will drain out the outlet line 16 under the force of gravity or pressure in the metering vessel 10. As the free float 24 moves downwardly with the liquid level the upper movable member 20 will fall to the position illustrated in Figure 3 thereby permitting the upper bleed valve 34 to close and allowing pressure to come to an equilibrium on both of the diaphragms in the pressure responsive pilot valve 64. This movement of the upper movable member 20 will operate the counter 91. The free float 24 follows the liquid level as it descends until the float 24 contacts the lower movable member 22 and pivots it downwardly into the position illustrated in Figure 3 opening the lower bleed valve 56 draining pressure from the left hand diaphragm assembly 68 of the pressure responsive pilot valve 64 snapping the valve stem 74 to the left thereby simultaneously closing the outlet valve 18 and opening the inlet valve 14 whereupon liquid enters the metering vessel 10 through the inlet line 12. As the liquid level and consequently the float 24 rise, the tension spring 58 will pull the lower contact member 52 away from the button 54 on the lower bleed valve 56 bringing to equilibrium once again the pressure on the diaphragms 76 and 78 of the pressure responsive pilot valve 64. Thereafter the cycle is repeated.

The upper dumping level or level at which the upper contact member 30 opens the upper bleed valve 34 may be calibrated by adjusting the angle between the upper contact arm 30 and the upper movable member 20 by means of the set screw 32. Similarly, the lower dumping level may be calibrated and adjusted by adjusting the angle between the lower contact arm 52 and lower movable member 22. Thus the upper and lower dumping levels may be calibrated entirely independently of one another.

Because the float 24 conforms to and substantially fills the horizontal cross sectional configuration of the metering chamber 25 the upward and downward movement of this float 24 prevents a build up of paraffin and like substances on the internal walls of the metering chamber 25 thereby preserving a constant volume of the metering chamber 25 and accuracy of the metering apparatus. In practice, a thin coating of paraffins may build up on the internal wall of the metering chamber 25 in the space between the float 24 and the internal wall after the first few cycles of operations. This coating serves as a lubricant for the float 24 and after it forms the metering apparatus may be calibrated in the manner previously described and thereafter the float 24 will prevent any further build-up of deposits and the volume of liquid passing through the metering apparatus will remain constant.

The liquid being metered will often contain foam which collects at the surface of a liquid in the metering chamber 25. The free float 24 is of such weight for its size that it will float in the liquid but sink in the foam and thus indicates the surface of the liquid and not of the foam. Such a weighted float of large size will more accurately indicate the true liquid level than a float of small size. Because the free float 24 substantially fills the horizontal cross-sectional configuration of the metering chamber 25 it is of larger size than a float which does not substantially fill it and therefore for a metering chamber of given horizontal area this free float 24 may be larger than one which does not rise vertically and thus more accurately indicates the true liquid level. Further the weight of the free float 24 is such that the lifting effect of the friction of foam moving past it to collect above the liquid is negligible.

Referring now to Figure 1 there is shown a metering separator 200 in which illustration parts which are the same as in Figure 2 bear the same numbers as in Figure 2, in which modified parts are identified by the suffix "a," and in which different parts are indicated by numbers above 200.

The metering separator 200 has the well fluid inlet 202 for introducing well fluid into the separator chamber 204. A degassing element 206 is provided so that gas flows upwardly through a conventional screen or mist-extracting element 208 and out the gas outflow line through a back pressure valve 211. A partition 212 is provided in the metering separator 200 forming the bottom of the separator chamber 204 and the top of the liquid metering vessel 10. As oil and gas flow into the separator chamber 204, the gas flows out the gas outflow line 210 and oil collects in the lower portion of the separator 204. A discharge line 12a which also serves as an inlet line to the metering vessel 10 supplies oil from the separator chamber 204 to the metering vessel 10 through the common flow line 213 in response to actuation of an inlet valve element here included in a 3-way valve 215 which contains both inlet and outlet valve elements. Thus the metering vessel 10 in effect forms a lower portion of the metering separator 200.

The pressure line 80a in this metering separator 200 is connected to the top of the separator chamber 204 rather than to the metering vessel 10 as illustrated in Figure 2, and the gas equalizing connection 96a extends into the upper portion of the separator chamber 204. A conventional sight gauge 214 may be provided to indicate a liquid level in the separator chamber 204.

The 3-way valve 215 is a pressure responsive valve of which many are readily available commercially. In one position it allows liquid to enter the metering vessel 10 through the common flow line 213 and prevents it from draining therefrom. In another position it permits draining from the metering vessel 10 through the common flow line 213 and outlet line 16a and prevents filling of the metering vessel 10. No further description of this 3-way valve 215 is necessary. The particular 3-way valve 215 here illustrated is a double acting motor diaphragm valve with pressure being applied to and drained from opposite sides of its diaphragm (not shown) by the pressure lines 86a and 88a from the pressure responsive pilot valve 64.

In operation of this liquid metering separator of Figure 1, as the free float 24 contacts the upper and lower movable members 20 and 22 respectively in response to the inflow and outflow of liquid in the metering chamber 25, the inlet and outlet valve elements in the 3-way valve 215 are simultaneously opened and closed, respectively, to permit filling and emptying of the metering chamber 25 in the same manner as described in relation to the structure of Figures 2 and 3. While liquid is emptying from the metering chamber 25 liquid has been accumulating in the separator chamber 204. When the inlet valve element opens and the outlet valve element closes in the 3-way valve 215 this liquid flows into the liquid metering vessel 10.

Other than the differences here discussed the mechanism and mode of operation are the same as that described in connection with Figures 2 and 3 and no more detailed description is necessary.

While the structures shown in Figures 1 through 3 have been described as operating at above atmospheric pressure, it may be in certain instances they will be operated at atmospheric pressure or less in which event extraneous gas at a suitable pressure may be supplied to the pressure line 80 or 80a for actuation of the inlet and outlet valve elements.

Although the inlet and outlet valve element control means including the operating pressure system and the control pressure system has been here illustrated and is particularly useful with the free float 24 it is to be understood that such valve element control means may be used in other systems where the upper movable member 20 and the lower movable member 22 are moved by changing liquid levels. Also the free float 24 and metering chamber 25 of uniform horizontal configuration have utility with other means controlling the liquid flow into and out of a metering apparatus.

While the present invention has been described in connection with metering and separating oil and gas, it will be understood that the invention may be used for metering any type of liquid and gas under any or all pressure conditions and in combinations with various other apparatus. In addition, rearrangement and substitution of parts will readily suggest themselves to those skilled in the art and such are encompassed with the spirit of the invention and the scope of the appended claims.

The invention therefore is well suited to carry out the objects and attain the advantages and ends mentioned as well as others inherent therein. Accordingly, the invention is to be limited only by the spirit thereof and the scope of the appended claims.

What is claimed is:

1. A liquid metering apparatus comprising, a vertical metering chamber having inlet and outlet passages and pressure responsive inlet and outlet valve elements therein, said chamber being of uniform horizontal sectional configuration; a free float in said chamber substantially filling and loosely fitting the horizontal configuration of the chamber and adapted to float on liquid in the chamber; and valve element control means including an operating pressure system connected to the inlet and outlet valve elements, said system including a pressure responsive pilot valve adapted in one position to simultaneously direct pressure to portions of the inlet and outlet valve elements and drain it from the other portions of the inlet and outlet valve elements and in another position to oppositely direct and drain said pressure to and from said inlet and outlet valve elements, thereby alternately opening and closing said inlet and outlet valve elements simultaneously, and a control pressure system connected to and operating the pressure responsive pilot valve, said control pressure system including an upper movable member in an upper portion of the metering chamber adapted to be moved by the float when the float reaches a predetermined upper level, a bleed valve in an upper pressure line connected to the pressure responsive pilot valve, upper actuating means controlled by said upper movable member opening the upper bleed valve upon predetermined movement of the control member by upper movement of the float and permitting the upper bleed valve to close upon downward movement of the float, a lower movable member in a lower portion of said metering chamber adapted to be moved by the float when said float reaches a predetermined low level, a lower bleed valve in a lower pressure line connected to the pressure responsive pilot valve, lower actuating means controlled by said lower movable member opening the lower bleed valve upon predetermined movement of the control member by downward movement of the float and permitting the lower bleed valve to close upon upward movement of the float, and a restriction in each pressure line upstream of each bleed valve whereby opening the upper bleed valve by the float actuates the pressure responsive pilot valve to one position thereby simultaneously closing the inlet valve element and opening the outlet valve element, and opening the lower bleed valve by the float actuates the pressure responsive pilot valve to another position thereby simultaneously opening the inlet valve element and closing the outlet valve element.

2. The liquid metering apparatus of claim 1 including a counter mechanism for counting each time the metering chamber fills and drains.

3. The liquid metering apparatus of claim 1 in which the pressure responsive pilot valve includes double diaphragms and each pressure line is connected to one each of said diaphragms.

4. In a liquid metering apparatus including a metering chamber having inlet and outlet passages and inlet and outlet valve elements therein, the improvement of valve element control means comprising an operating pressure system connected to the inlet and outlet valve elements said system including a pressure responsive pilot valve adapted in one position to simultaneously direct pressure to portions of the inlet and outlet valve elements and drain it from other portions of the inlet and outlet valve elements and in another position to oppositely direct and drain said pressure to and from said inlet and outlet, valve elements thereby alternately closing and opening said inlet and outlet valve elements simultaneously; and a control pressure system connected to and operating the pressure responsive pilot valve, said control pressure system including an upper movable member in an upper portion of the metering chamber adapted to be moved by means movable with changing liquid level when the liquid level reaches a predetermined upper level, a bleed valve in an upper pressure line connected to the pressure responsive pilot valve, upper actuating means controlled by said upper movable member adapted to open the upper bleed valve upon predetermined movement of the control member by rising liquid level and to permit the upper bleed valve to close upon falling liquid level, a lower movable member in a lower portion of said metering chamber adapted to be moved by means movable with changing liquid level when said liquid level reaches a predetermined low level, a lower bleed valve in a lower pressure line connected to the pressure responsive pilot valve adapted to open the lower bleed valve upon predetermined movement of the control member by downward movement of the liquid level and to permit the lower bleed valve to close upon upward movement of the liquid level, and a restriction in each pressure line upstream of each bleed valve whereby opening the upper bleed valve by rising liquid level actuates the pressure responsive valve to one position thereby simultaneously closing the inlet valve element and opening the outlet valve element, and opening the lower bleed valve by a falling liquid level actuates the pressure responsive pilot valve to another position thereby simultaneously opening the inlet valve element and closing the outlet valve element.

5. The invention of claim 4 in which the pressure responsive pilot valve includes double diaphragms and each pressure line is connected to one each of said diaphragms.

6. A metering separator comprising a body including an upper separator chamber and a vertical lower liquid metering chamber, means for introducing liquid and gas into the separator chamber, outlet means at the upper end of the separator chamber for discharging gas therefrom, liquid outlet means in the separator chamber for discharging liquid therefrom, said liquid metering chamber being of uniform horizontal sectional configuration and having inlet and outlet passages including inlet and outlet pressure responsive valve elements therein, said inlet passage connected to said liquid outlet means from said separator chamber, a free float in said metering chamber substantially filling and loosely fitting the horizontal configuration of said chamber and adapted to float on liquid in said chamber, and valve element control means actuated by said float upon liquid level in the metering chamber reaching a predetermined upper level to simultaneously open the outlet valve element and close the inlet valve element, and actuated by the float upon the liquid level in the chamber reaching a predetermined low level to simultaneously close the outlet valve element and open the inlet valve element.

7. A metering separator comprising a body including an upper separator chamber and a vertical lower liquid metering chamber, means for introducing liquid and gas into the separator chamber, outlet means at the upper end of the separator chamber for discharging gas therefrom, liquid outlet means in the separator chamber for discharging liquid therefrom, said liquid metering chamber being of uniform horizontal sectional configuration and having inlet and outlet passages including inlet and outlet pressure responsive valve elements therein, said inlet passage connected to said liquid outlet means from said separator chamber, a free float in said metering chamber substantially filling and loosely fitting the horizontal configuration of said chamber and adapted to float on liquid in said chamber, and valve element control means including an operating pressure system connected to the inlet and outlet valve elements, said system including a pressure responsive pilot valve adapted in one position to simultaneously direct pressure to portions of the inlet and outlet valve elements and drain it from other portions of the inlet and outlet valve elements and in another position to oppositely direct and drain pressure to and from said inlet and outlet valve elements thereby alternately closing and opening said inlet and outlet valve elements simultaneously, and a control pressure system connected to and operating the pressure responsive pilot valve, said control pressure system including an upper movable member in an upper portion of the metering chamber adapted to be moved by the float when the float reaches a predetermined upper level, a bleed valve in an upper pressure line connected to the pressure responsive pilot valve, upper actuating means controlled by said upper movable member opening the upper bleed valve upon predetermined movement of the upper control member by upward movement of the float and permitting the upper bleed valve to close upon downward movement of the float, a lower movable member in a lower portion of said metering chamber adapted to be moved by the float when said float reaches a predetermined low level, a lower bleed valve in a lower pressure line connected to the pressure responsive pilot valve, lower actuating means controlled by said lower movable member opening the lower bleed valve upon predetermined movement of the lower control member by downward movement of the float and permitting the lower bleed valve to close upon upward movement of the float, and a restriction in each pressure line upstream of each bleed valve whereby opening the upper bleed valve by the float actuates the pressure responsive pilot valve to one position thereby simultaneously closing the inlet valve element and opening the outlet valve element, and opening the lower bleed valve by the float actuates the pressure responsive pilot valve to another position thereby simultaneously opening the inlet valve element and closing the outlet valve element.

References Cited in the file of this patent

UNITED STATES PATENTS

| | | |
|---|---|---|
| 763,115 | Robinson | June 21, 1904 |
| 2,211,282 | McKeever | Aug. 13, 1940 |
| 2,348,357 | Parks | May 9, 1944 |
| 2,487,933 | Martin | Nov. 15, 1949 |